United States Patent
Glavak et al.

(10) Patent No.: US 12,546,340 B2
(45) Date of Patent: Feb. 10, 2026

(54) METHOD FOR OPERATING AN AXIAL PISTON MACHINE IN WHICH A ZERO CASE IS TAKEN INTO ACCOUNT

(71) Applicant: Robert Bosch GmbH, Stuttgart (DE)

(72) Inventors: Alex Glavak, Neu-Ulm (DE); Benjamin Rosenbaum, Arnsberg (DE); Joerg Spang, Neu-Ulm (DE); Ulrich Schill, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/932,292

(22) Filed: Oct. 30, 2024

(65) Prior Publication Data

US 2025/0146515 A1 May 8, 2025

(30) Foreign Application Priority Data

Nov. 6, 2023 (DE) ................... 10 2023 210 960.3

(51) Int. Cl.
*F15B 13/04* (2006.01)
*B60K 25/02* (2006.01)
(Continued)

(52) U.S. Cl.
CPC .......... *F15B 13/0401* (2013.01); *F03C 1/003* (2013.01); *F04B 1/295* (2013.01);
(Continued)

(58) Field of Classification Search
CPC .. F15B 13/0401; F15B 15/1428; F15B 19/00; F03C 1/003; F04B 1/295; F04B 1/324;
(Continued)

(56) References Cited

U.S. PATENT DOCUMENTS

| 2011/0277459 A1* | 11/2011 | Loritz | F04B 49/002 60/464 |
| 2015/0033728 A1* | 2/2015 | Glaz | E02F 9/2285 60/445 |

(Continued)

FOREIGN PATENT DOCUMENTS

| DE | 10 2010 020 528 A1 | 11/2011 |
| DE | 10 2019 210 003 A1 | 1/2021 |
| DE | 10 2021 200 693 A1 | 7/2022 |

OTHER PUBLICATIONS

"Axial Piston Variable Pump A4VG Series 35", Data sheet, Bosch Rexroth AG, Feb. 12, 2020 (34 pages).

*Primary Examiner* — Audrey B. Walter
(74) *Attorney, Agent, or Firm* — Maginot, Moore & Beck LLP

(57) ABSTRACT

A method is for operating an axial piston machine whose displacement volume is continuously adjustable using a double-acting control cylinder having two oppositely acting control chambers. The method includes providing a corresponding axial piston machine. An electrically adjustable pressure control valve is connected to one control chamber. Another control chamber is connected to an electrically adjustable 3/2-way switching valve. The method includes providing a target control pressure difference. A zero case is defined as a case in which the target control pressure difference is essentially zero. A positive case is defined as a case in which the target control pressure difference is positive. A negative case is defined as a case in which the target control pressure difference is negative. The method further includes calculating a first and a second control pressure. A case differentiation includes determining whether the zero case, the positive case, or the negative case is present.

10 Claims, 4 Drawing Sheets

(51) Int. Cl.
*F03C 1/00* (2006.01)
*F04B 1/295* (2020.01)
*F04B 1/324* (2020.01)
*F04B 49/00* (2006.01)
*F04B 49/22* (2006.01)
*F15B 15/14* (2006.01)
*F15B 19/00* (2006.01)
*F16H 61/431* (2010.01)

(52) U.S. Cl.
CPC ............ *F04B 1/324* (2013.01); *F04B 49/002* (2013.01); *F04B 49/22* (2013.01); *F15B 15/1428* (2013.01); *F15B 19/00* (2013.01); *F16H 61/431* (2013.01); *B60K 2025/026* (2013.01)

(58) Field of Classification Search
CPC ...... F04B 49/002; F04B 49/22; F16H 61/431; B60K 2025/026
See application file for complete search history.

(56) References Cited

U.S. PATENT DOCUMENTS

2018/0231121 A1* 8/2018 Witte ................. F16H 61/4017
2022/0243718 A1* 8/2022 Mutschler ............ G05B 13/048

* cited by examiner

METHOD FOR OPERATING AN AXIAL PISTON MACHINE IN WHICH A ZERO CASE IS TAKEN INTO ACCOUNT

This application claims priority under 35 U.S.C. § 119 to patent application no. DE 10 2023 210 960.3, filed on Nov. 6, 2023 in Germany, the disclosure of which is incorporated herein by reference in its entirety.

The disclosure relates to a method of operating an axial piston machine.

BACKGROUND

From the data sheet "Axialkolben-Verstellpumpe A4VG Baureihe 35" of Bosch Rexroth AG (order number RD92035; edition Feb. 12, 2020), an axial piston machine in a swashplate design is known, the displacement volume of which is adjustable across zero by means of a double-acting control cylinder, so that, while the drive rotation direction is kept the same, the conveying direction can be reversed merely by adjustment of the swashplate. For the ET adjustment, the two control chambers of the control cylinder are connected to one pressure control valve each, in the form of a pressure reducing valve. In the event of failure of the electric control, it is not clear what displacement volume is set.

This behavior is undesirable in hydraulic fan drives. There, the fan is usually to rotate at maximum speed if the electric control fails (fail-safe behavior).

DE 102010 020 528 A1 shows a fan drive having a closed hydraulic circuit essentially comprising the axial piston machine discussed above. Here, the control cylinder is controlled by means of a pressure control valve in the form of a pressure reducing valve with rising or positive characteristic curve and by means of a 4/2-way switching valve, the two control valves being electrically adjustable. The circuit is designed such that, in the event of failure of the electric control, the axial piston machine automatically sets a displacement volume of maximum magnitude, so that the two fan wheels rotate at maximum speed.

Furthermore, the circuit is designed such that the current at the pressure control valve does not need to be adjusted abruptly in the event of a zero crossing of the control pressure difference. During the zero crossing, the corresponding control current drops to zero and then rises again, and only the 4/2-way switching valve is switched over abruptly.

The disadvantage of this control is that a special valve block especially adapted to the fan drive is required for the control valves. If different behavior is desired instead of the aforementioned fail-safe behavior, the valve block must be modified.

SUMMARY

An advantage of the disclosure is that, merely with control valves available from the catalog, the known axial piston machine can be designed such that the aforementioned fail-safe behavior is achieved. At the same time, a large number of drive variants can be implemented by means of the appropriate choice of the direction of control and of the mounting location of the two control valves, without mechanical special designs being required over catalog components which are already known. It is merely required that the program of the control device is adapted to the control valves chosen for use.

A method for operating an axial piston machine is proposed, wherein a displacement volume of the axial piston machine is continuously adjustable by means of a double-acting control cylinder comprising two oppositely acting control chambers, the method comprising the following steps:

a) providing a corresponding axial piston machine, wherein an electrically adjustable pressure control valve is connected to one control chamber, wherein the other control chamber is connected to an electrically adjustable 3/2-way switching valve;

b) providing a target control pressure difference, wherein a zero case is defined as a case in which the target control pressure difference is essentially zero, wherein a positive case is defined as a case in which the target control pressure difference is positive, wherein said target control pressure difference does not fall under the zero case, wherein a negative case is defined as a case in which the target control pressure difference is negative, wherein said target control pressure difference does not fall under the zero case;

c) calculating a first and a second control pressure, wherein in the context of a case differentiation it is determined whether the zero case, the positive case or the negative case is present, wherein the result of the case differentiation is taken into account in the calculation of the first and a control pressure;

d) energizing the pressure control valve according to the first control pressure and energizing the 3/2-way switching valve according to the second control pressure.

Step a) is preferably carried out before all other steps of the method. With this step, fail-safe behavior of a fan drive can be brought about; further details are presented below with reference to FIG. 1. However, this design has the result that the pressure control valve is preferably adjusted abruptly in the event of a zero crossing of the target control pressure difference. This circumstance is taken into account with the remaining method steps b), c) and d). As a result, jerky operating behavior of the axial piston machine is avoided, especially when the axial piston machine is used as part of a fan drive.

The target control pressure difference is essentially zero when it cannot be ensured, by setting the pressure control valve and the 3/2-way switching valve, that the actual control pressure difference is either reliably positive or reliably negative. Thus, as long as the actual control pressure difference set in reality can fluctuate around zero due to control inaccuracies, the zero case is present.

Steps b), c) and d) of the method are preferably realized at least partly in the form of a computer program executed by a control device of the axial piston machine, the control device preferably comprising a programmable digital computer and/or an FPGA.

The pressure control valve and the 3/2-way switching valve are preferably each directly connected to the associated control chamber. They are preferably each configured as a built-in valve which is fixedly installed in a bore leading into the relevant control chamber.

Advantageous developments and improvements of the disclosure are specified in the dependent claims.

It may be provided that steps b), c) and d) are performed continually and in parallel or quasi-parallel with each other during operation of the axial piston machine. The mentioned steps are preferably performed discretely in time in a plurality of calculation rounds which follow one another at a calculation time interval, wherein all of steps b), c) and d)

are taken into account in each calculation round. Within a calculation round, the individual calculation steps can be performed one after the other; this is then referred to as a quasi-parallel calculation. The calculation time interval is preferably constant and equals, for example, 1 ms. Such a computer program may be created with, for example, the Matlab Simulink programming system. However, it can also be created in the programming language C or C++ or in any other programming language.

The calculation process within a single calculation round is preferably free of calculational feedback (feed forward), while calculational feedback can be realized in successive calculation rounds. The mentioned calculational feedback is to be distinguished from physical feedback at the real axial piston machine, for example in the context of the control loop discussed with reference to FIG. 2, which control loop comprises two real pressure sensors.

It may be provided that, in the context of step d), the pressure control valve is energized with a first control current, wherein the 3/2-way switching valve is energized with a second control current, wherein the first control current is calculated from the first control pressure by means of an inverse model of the pressure control valve, wherein the second control current is calculated from the second control pressure by means of an inverse model of the 3/2-way switching valve. In the simplest case, the mentioned models are static models. In the case of the pressure control valve, this static model is the valve characteristic curve which assigns a first control pressure to each first control current, this assignment being dependent on the pressure in the control supply of the pressure control valve. This model calculates along the physical cause-and-effect relationship. Conversely, the corresponding inverse model assigns a first control current to each first control pressure. Said inverse model works in the reverse direction with respect to the mentioned cause-effect relationship. In the context of the method according to the disclosure, dynamic models may be used which take into account how quickly the relevant valve reacts to a change in the control current. The static model of the 3/2-way switching valve distinguishes only the two discrete switching states of the 3/2-way switching valve. One switching state is preferably biased by a restoring spring so that the second control current is zero. In the other state, the second control current is then large enough that the force of the restoring spring is reliably and quickly overcome. It is conceivable that the second control current is the current which the actuation solenoid of the 3/2-way switching valve just still permanently withstands without overheating. The second control pressure is either the pressure in the control supply or the pressure in the control return, these two pressures being known during operation of the axial piston machine. For example, the pressure in the control supply is specified by the setting of a feed pressure limiting valve, which setting is usually fixed.

It may be provided that, in the context of step d), the first and second control pressures are calculated for the zero case, for the positive case and for the negative case separately, wherein one of the results of the three mentioned calculations is selected on the basis of the case differentiation mentioned in step d). In the context of the quasi-parallel calculation explained above, the above method design has the result that the time for the calculation of a calculation round does not substantially fluctuate no matter which state the axial piston machine is in. Thus, it can be easily ensured that the required calculation time in each calculation round is less than the calculation time interval.

It may be provided that, in the context of step d), in the zero case a first and a second pair are calculated, which each comprise the first and second control pressures, wherein in the first pair the second control pressure equals the pressure in a control supply, wherein the first control pressure is calculated according to this second control pressure and the target control pressure difference, wherein in the second pair the second control pressure is equal to the pressure in a control return, wherein the first control pressure is calculated according to this second control pressure and the target control pressure difference, wherein, according to the case most recently present in the context of the case differentiation and/or, if desired, the case expected to be present in the future, it is decided whether the first pair or the second pair is used as the calculation result. In this case, a calculation is understood to mean simply providing the mentioned numerical values, which are preferably stored as parameters in the control device. The first control pressure is preferably equal to the sum of the target control pressure difference and the second control pressure. The second control pressure can assume only positive values, while the target control pressure difference can assume positive and negative values. The decision as to which pair is used is made preferably according to the derivative of the target control pressure difference with respect to time. Further details are given below with reference to FIG. 3.

It may be provided that, in the context of the zero case of step d), the first pair and the second pair are calculated, wherein one of the two calculation results is selected on the basis of the mentioned decision. Thus, it can be easily ensured that the required calculation time in each calculation round is less than the calculation time interval.

It may be provided that, in the context of step c), in the positive case the second control pressure is equal to the pressure in a control return, wherein the first control pressure is calculated according to said second control pressure and the target control pressure difference.

It may be provided that, in the context of step c), in the negative case the second control pressure is equal to the pressure in a control supply, wherein the first control pressure is calculated according to said second control pressure and the target control pressure difference.

It may be provided that, in the context of step a), an axial piston machine having a first and a second working port is provided, wherein a first and a second pressure sensor are provided, by means of which a first and a second actual pressure, respectively, can be measured at the respectively associated first and second working ports, wherein, in the context of step b), the target control pressure difference is calculated according to the first and second actual pressures and a specified target conveying pressure difference. The last-mentioned calculation preferably takes place in such a way that the difference between the first actual pressure and the second actual pressure approaches the target conveying pressure difference. The calculation can be carried out in the sense of closed-loop control. Preferably, the mentioned calculation comprises the calculation of a linear controller, for example a PID controller. Feed-forward control may be superimposed on this closed-loop control. In the context of the feed-forward control, trajectory planning may be performed, in which, from the target conveying pressure difference, a planned target conveying pressure difference is determined which, in the context of the feed-forward control, can be brought into good agreement with the corresponding actual conveying pressure difference. This allows for, in particular, abrupt changes in the target conveying pressure difference which are not achievable with the actual conveying pressure difference and which make the calculation of the feed-forward control significantly more difficult. In the context of this feed-forward control, an inverse model of the axial piston machine may be used, such as is described for example in DE 10 2019 210 003 A1 or in DE 10 2021 200 693 A1, wherein the first-mentioned patent application also describes trajectory planning. Of course, the feed-forward control may also be performed without superposed closed-loop control.

It may be provided that, in the context of step a), an axial piston machine having a speed sensor is provided, wherein an actual speed of the axial piston machine can be measured by means of the speed sensor, wherein the target control pressure difference is calculated, in the sense of feed-forward control, according to the actual speed. The mentioned actual speed is preferably taken into account in the inverse model of the axial piston machine.

Of course, the above-mentioned features and those to be explained below can be used not only in the combination indicated in each case, but also in other combinations or on their own, without going beyond the scope of the disclosure.

BRIEF DESCRIPTION OF THE DRAWINGS

The disclosure is explained in more detail below with reference to the enclosed drawings. The figures show.

DETAILED DESCRIPTION

Figure 1:
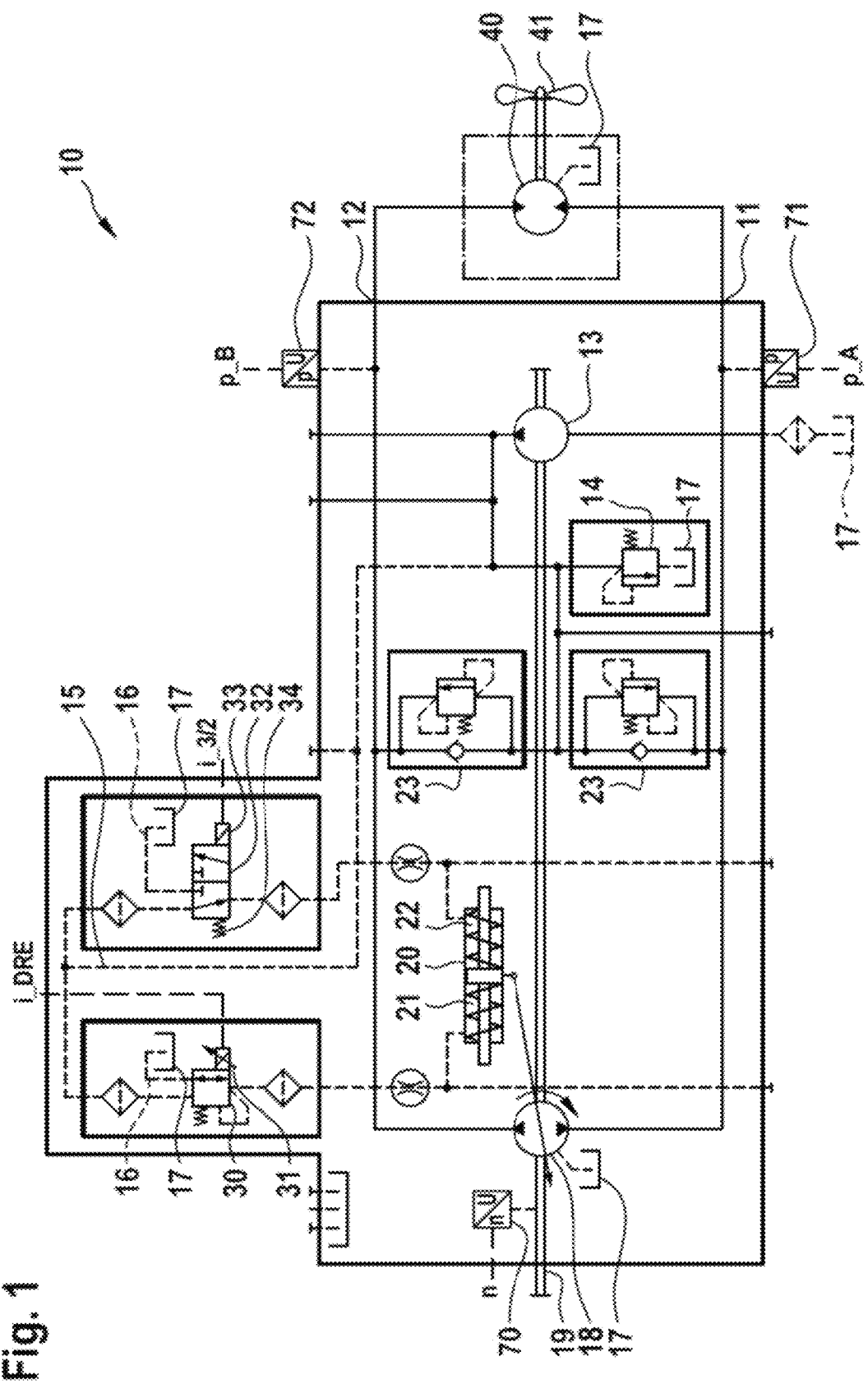
FIG. 1 a hydraulic circuit diagram of an axial piston machine according to the disclosure.

FIG. 1 shows a hydraulic circuit diagram of an axial piston machine 10 according to the disclosure. The axial piston machine 10 comprises a main pump 18 and a feed pump 13, which are driven by a common drive shaft 19. The actual speed n of the drive shaft 19 may be measured by a speed sensor 70, which is preferably fixedly attached to the axial piston machine 10.

The main pump 18 is configured in an axial piston design, wherein its displacement volume is continuously adjustable, preferably by means of a pivotable swashplate. The swashplate is coupled, with respect to motion, to the control piston of a double-acting control cylinder 20. The control cylinder 20 has a first and a second control chamber 21; 22, wherein the pressures there, the numerical values of which correspond to p_DRE; p_3/2 in FIG. 3, act on the control piston in opposite directions. The first control chamber 21 is fluidly connected directly to a pressure control valve 30, which is preferably in the form of a pressure reducing valve, said pressure control valve being electrically adjustable by means of an actuation solenoid 31. The second control chamber 22 is fluidly connected directly to a 3/2-way switching valve 32, which is electrically adjustable by means of an actuation solenoid 33, said 3/2-way switching valve being biased by means of a restoring spring 34 into a position in which the control supply 15 is connected through (so-called open position). The pressure control valve 30 and/or the 3/2-way switching valve 32 are preferably each controlled with a voltage, the duty cycle of which is selected such that, on average over time, a current results, the numerical value of which corresponds to i_DRE or i_3/2, respectively. For this purpose, preferably in each case a digitally implemented current control loop is used, which is most preferably calculated by the control device which also carries out the method according to the disclosure.

In the present case, the pressure control valve 30 has a positive characteristic curve, such that, in its currentless state, the low pressure in the control return 16 is present in the first control chamber 21. The 3/2-way switching valve is normally open, so that in its currentless state the high pressure in the control supply 15 is present in the second control chamber 22. The present main pump 18 is adjustable across the displacement volume of zero. Accordingly, in the currentless state, a displacement volume of maximum magnitude is set, so long as the drive shaft 19 rotates. The corresponding direction of rotation is configured such that the fan wheel 41 rotates according to the desired cooling air conveying direction. This behavior is desired in the vast majority of cases of fan drives, so that the internal combustion engine to be cooled is sufficiently cooled even in the event of a failure of the electric control.

The feed pump 13 may be in the form of a rotary vane pump, for example. It draws pressurized fluid from a tank 17 and conveys it into the control supply 15 and, via the feed valves 23, also into the closed hydraulic circuit. In FIG. 1, all tank symbols 17 refer to the same tank. The pressurized fluid is preferably a liquid and most preferably hydraulic oil. The output of the feed pump 13 is connected to a feed pressure limiting valve 14. During most of the operating time of the axial piston machine 10, the delivery flow of the feed pump 13 is high enough that the feed pressure limiting valve 14 is triggered, so that the pressure in the control supply 15 is defined by the setting of the feed pressure limiting valve 14. In the present case the feed pressure limiting valve 14 is fixed, although an electrically adjustable feed pressure limiting valve can be used.

In the present case, the first and second working ports 11; 12 of the main pump 18 and of the axial piston machine 10 are fluidly connected to a hydraulic motor 40 in the sense of a closed hydraulic circuit. The hydraulic motor 40 drives a fan wheel 41 directly, which, for example, cools the internal combustion engine of a relatively large vehicle, in particular a mobile work machine. The disclosure is intended primarily for this application, although of course it can also be used for other applications. The target conveying pressure difference explained below can be used as a control variable, for example in a superposed control loop by means of which the speed of the fan wheel 41 is controlled. The method according to the disclosure is intended to require only the first and second pressure sensors 71; 72 and the speed sensor 70; no other sensors are absolutely necessary. Of course, for example a pivot angle sensor may be optionally used on the main pump 18 or another speed sensor may be optionally used on the hydraulic motor 40 to improve the operating behavior of the overall system.

With the first pressure sensor 71, a first actual pressure p_A can be measured at the first working port 11. With the second pressure sensor 72, a second actual pressure p_B can be measured at the second work port 12.

Reference should also be made to the two feed valves 23, via which pressurized fluid can be conveyed from the feed pump 13 into the closed hydraulic circuit to compensate for leakages. It is conceivable to equip the axial piston machine 10 with a purge valve by which, in addition to said leakages, pressurized fluid can be drawn from the closed hydraulic circuit in a controlled way so that the pressurized fluid there does not overheat. However, this hazard is low in the case of the present fan drive.

Figure 2:
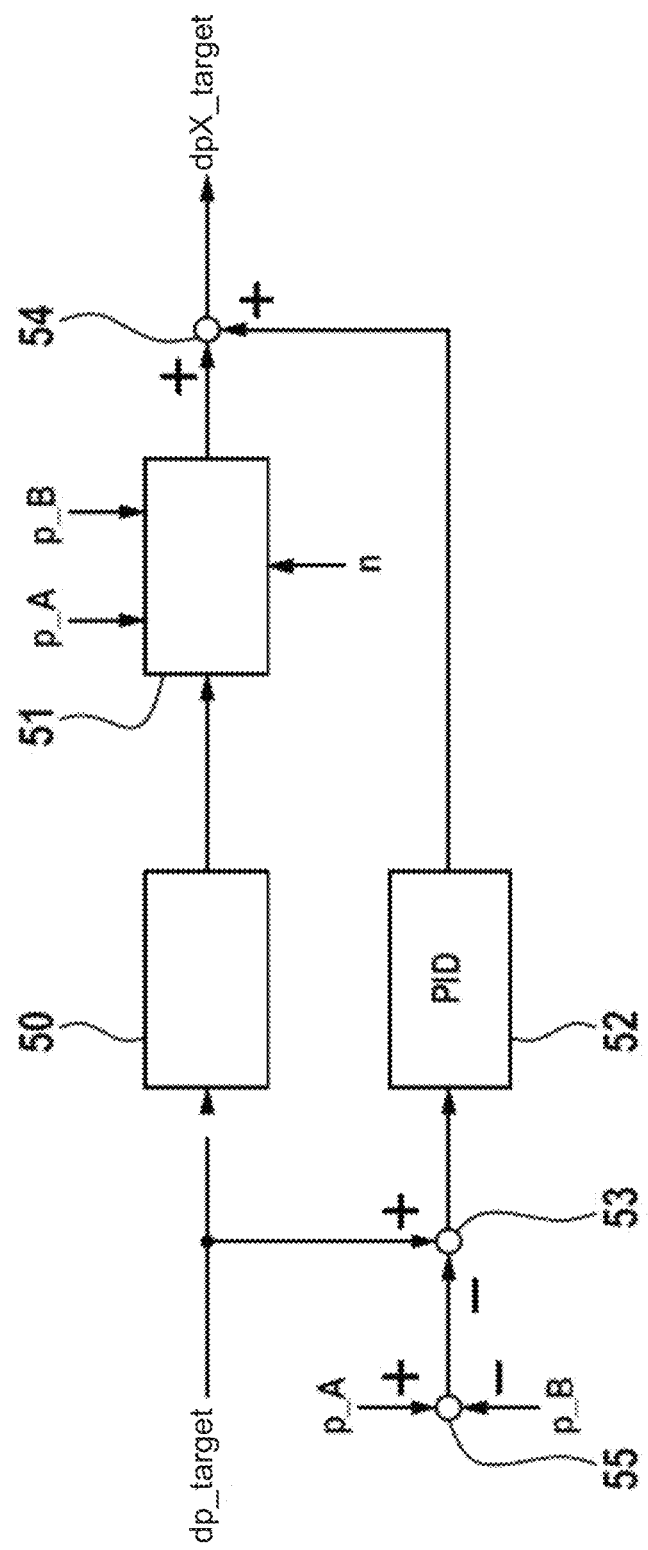
FIG. 2 a part of a control diagram implementing the method according to the disclosure.

FIG. 2 shows a part of a control diagram implementing the method according to the disclosure. The part of the control diagram shown in FIG. 2 may be subject to significant variations without departing from the scope of the disclosure. For example, the feed-forward control with the trajectory planning filter 50 and with the inverse model 51 of the axial piston machine may be used alone. It is also conceivable that the controller 52 is used alone. In any case, a functionally capable overall system is provided; FIG. 2 shows the most complex variant with the best operating properties.

A target conveying pressure difference dp_target is specified to the axial piston machine from the outside, wherein the difference between the first and second actual pressures p_A; p_B measured by means of the first pressure sensor and the second pressure sensor, respectively, is to be set to the target conveying pressure difference dp_target.

To make this setting happen as quickly as possible, feed-forward control based on an inverse model 51 of the axial piston machine is first provided. The description in DE 10 2019 210 003 A1 specifies mathematical formulas by means of which the behavior of the axial piston machine can be modeled. DE 10 2021 200 693 A1 specifies a method by which a mathematical model of the axial piston machine can be determined in an experimental manner. Common to all of these models is that, in the case of an inversion, they provide useful results only if the inputted temporal profile of the conveying pressure difference can in fact be set in a real axial piston machine.

However, the target conveying pressure difference dp_target may have abrupt changes that cannot occur in the actual conveying pressure difference because the actual conveying pressure difference can change only continuously. Therefore, the target conveying pressure difference dp_target is first fed to a trajectory planning filter 50 before being fed to the inverse model 51 of the axial piston machine. In the simplest case, the trajectory planning filter 50 is a low-pass filter with a fixed cut-off frequency. In this way, the discussed abrupt changes can be easily eliminated. However, preferably the trajectory planning filter 50 disclosed in DE 10 2019 210 003 A1 is used, by means of which the performance capability of the axial piston machine can be optimally utilized so that, in the context of the feed-forward control, the target conveying pressure difference dp_target is approached particularly quickly.

Besides the modified target conveying pressure difference, the measured values from the sensors, namely the actual speed n of the drive shaft and the first and second actual pressures p_A; p_B, are also fed to the inverse model 51 of the axial piston machine, for the calculation of the model 51. As a result, the inverse model 51 of the axial piston machine provides a target control pressure difference dpX_target which theoretically must be set in order to achieve the fastest possible approach of the actual conveying pressure difference toward the target conveying pressure difference dp_target. Of course, this theoretical value does not perfectly match the real circumstances. Therefore, closed-loop control is superposed on the feed-forward control.

In the present case, the control variable of the controller 52 is a further target control pressure difference, which is additively superposed 54 with that of the feed-forward control in order to obtain dpX_target. It is conceivable that the control variable of the controller 52 starts at a suitable point of the inverse model 51 of the axial piston machine in order to improve the control behavior.

First, on the input side of the controller 52 the actual conveying pressure difference is calculated 55 as the difference 53 between the first and second actual pressures p_A; p_B. The control deviation results from the difference 53 between the target conveying pressure difference dp_target and the actual conveying pressure difference. The control deviation is fed to the controller 52, which is preferably in the form of a continuous linear controller, in particular a PID regulator. The controller 52 is preferably calculated discretely in time in the context of the round-based calculation method explained above.

Figure 3:
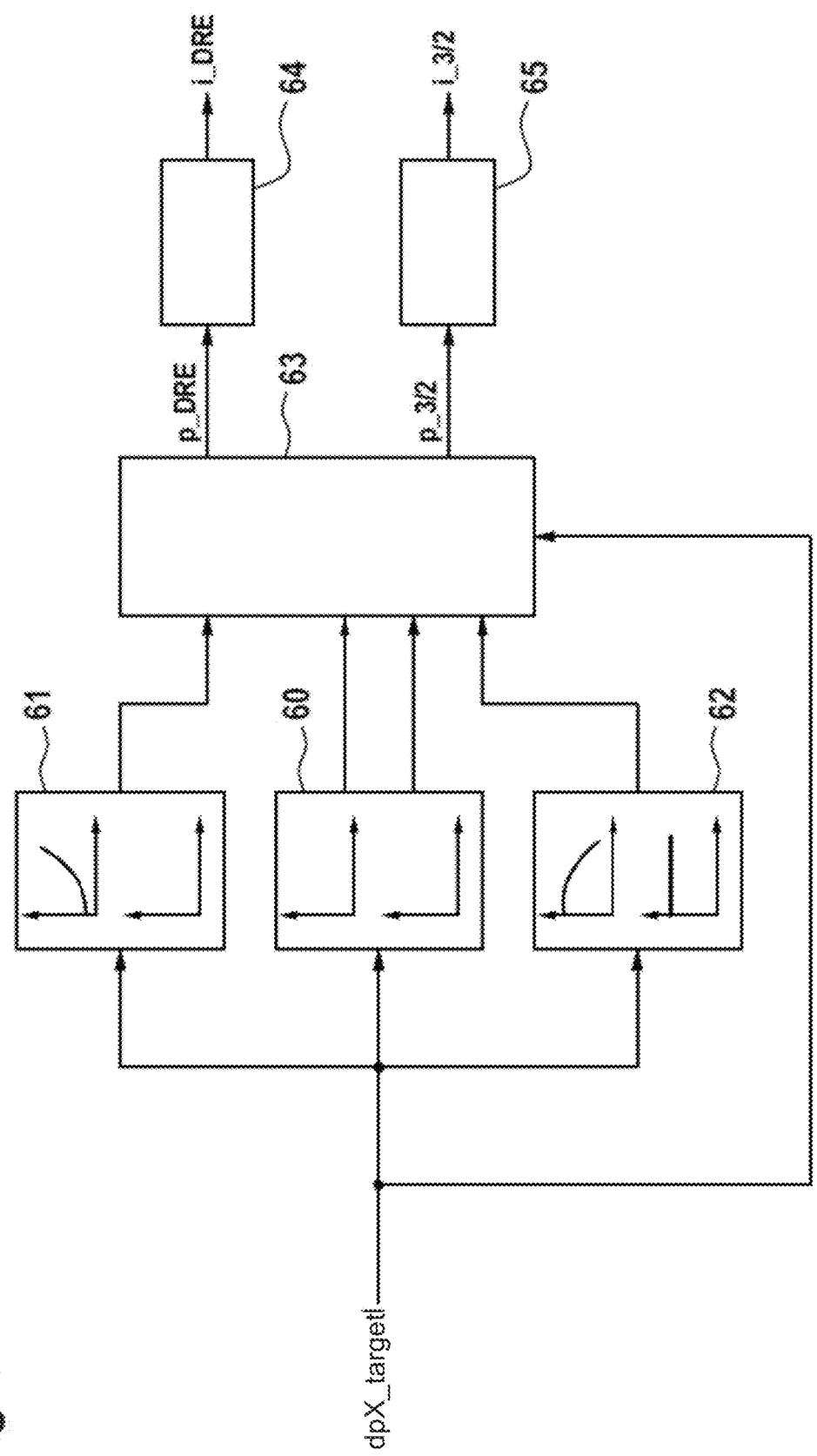
FIG. 3 another part of the control diagram from FIG. 2.

FIG. 3 shows another part of the control diagram from FIG. 2. The interface of FIGS. 2 and 3 is formed by the target control pressure difference dpX_target, which is also the primary input variable of the method according to the disclosure.

In the context of the disclosure, particular control valves are used, namely a pressure control valve and a 3/2-way switching valve. This selection has considerable advantages in the case of a fan drive, because different fan variants common on the market can be realized with the same components. In particular, it can be freely selected on which side of the control cylinder the pressure control valve is to be arranged, with the 3/2-way switching valve being arranged on the other side. This advantage comes at the expense of a significant disadvantage, which is rectified with the disclosure. In particular, the control behavior of the control valves at a target control pressure difference dpX_target equal to zero has a significant discontinuity which relates to both control valves. Thus, with a conventional, purely hydraulic control device, the present control valves are not usable, even if they were hydraulically actuatable. Therefore, in the context of the disclosure a method is used which is preferably implemented by means of a programmable digital computer, which in particular comprises a microprocessor.

The mentioned discontinuity is taken into account by distinguishing three cases, namely a zero case 60, a positive case 61, and a negative case 62. In the zero case 60, the target control pressure difference dpX_target is essentially zero, and the cases in which, because of control inaccuracies, it is not certain whether the actual control pressure difference actually set is positive or negative are also to be included.

Figure 4:
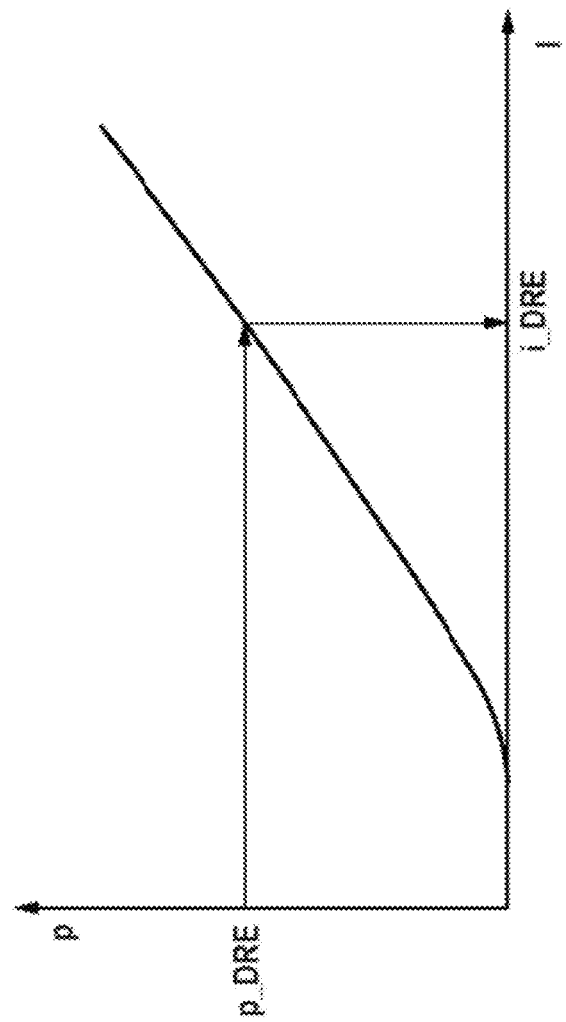
FIG. 4 a diagram illustrating the inverse model of the pressure control valve.

In the positive case 61, the target control pressure difference dpX_target is positive, and the zero case 60 is not present. In the positive case 61, the second control chamber is connected to the control return via the 3/2-way switching valve, so that in the second control chamber essentially the pressure of zero is present. In the case of the pressure control valve with rising characteristic curve shown in FIG. 1, the current i_DRE is thus approximately proportionally increased to the desired target control pressure difference dpX_target. The corresponding relationship is shown in FIG. 4.

In the negative case 62, the target control pressure difference dpX_target is negative, and the zero case is not present. In this case, the second control chamber is connected to the control supply via the 3/2-way switching valve, so that a high pressure is present in the second control chamber, this pressure simultaneously defining the maximum pressure that can be set with the pressure control valve. In the case of pressure control valve with positive characteristic curve shown in FIG. 1, the current i_DRE is decreased approximately inversely proportionally to the magnitude of the desired target control pressure difference dpX_target.

In the zero case 60, two zero settings of the control valves (numbers 30; 32 in FIG. 1) are possible. Either both of the control chambers may be connected to the control supply or both of the control chambers (numbers 21; 22 in FIG. 1) may be connected to the control return. In both cases of the zero setting, an effective pressure of zero acts on the control piston. Theoretically, the pressure control valve must not be set to an intermediate value. However, this is unavoidable in practice, in particular when a transition from the positive case 61 to the negative case 62 or vice versa occurs (zero crossing). This problem is addressed by the fact that the corresponding switchover is carried out only when it is actually necessary, and it is then carried out particularly quickly.

For this purpose, preferably all four conceivable cases of the first and second control pressures p_DRE; p_3/2 are calculated continually and quasi-simultaneously or, in the case of the zero settings, provided as constants, wherein only in the context of a case differentiation 63 is it determined which of the four cases is used to control the control valves (numbers 30; 32 in FIG. 1).

This case differentiation 63 is simple when clearly the positive or negative case 61; 62 is present. It becomes more difficult when a zero crossing occurs. Here, it is conceivable that the target control pressure difference dpX_target is abruptly adjusted across zero. In this sub-case, the simple case differentiation of the positive and negative cases 61; 62 already leads to the desired result, wherein the discontinuity caused by the control system is not troublesome due to the discontinuous adjustment of the target control pressure difference dpX_target.

If the zero crossing takes place in the context of a continuous adjustment of the target control pressure difference dpX_target, it can be predicted when theoretically the zero crossing will take place by observing the derivative of the target control pressure difference with respect to time. Then, the zero setting that does not require an abrupt adjustment of the control valves is set a short period of time before the theoretical zero crossing. During the zero case 60, the target control pressure difference dpX_target is further observed. If the zero case 60 is clearly exited in the sense of a zero crossing, the other zero setting is abruptly set.

With the inverse model 64 of the pressure control valve, the first control current i_DRE required for setting the desired pressure is determined. This may be accomplished with the static model shown in FIG. 4, which is simply the valve characteristic curve. However, it is also conceivable that a dynamic model is used which takes into account how quickly the pressure control valve reacts to changes in the first control current i_DRE. Due to the particularly fast adjustment desired in the zero case 60, a dynamic inverse model 64 is advantageous.

The inverse model 65 of the 3/2-way switching valve is used to determine the second control current i_3/2 required to set the desired pressure. Due to the underlying switching characteristic, basically only two cases are to be differentiated here. In one case, i_3/2 equals zero. In the other case, i_3/2 is as large as possible without allowing overheating of the corresponding actuation magnet (number 33 in FIG. 1). It is conceivable that a greater second control current i_3/2 is set during the switchover time period than in a later time period in which the 3/2-way switching valve is intended only to maintain its position. Firstly, a fast switchover can be achieved in this way, and secondly, the current consumption and the risk of overheating are minimized.

FIG. 4 shows a diagram illustrating the inverse model of the pressure control valve. It is a static model in the form of the valve characteristic curve. On the horizontal axis the (average) current in the actuation solenoid is plotted, and on the vertical axis the pressure applied at the outlet of the pressure control valve is plotted. The pressure control valve is preferably designed to have at least a monotonic characteristic curve. This ensures that the model can be clearly inverted. If a first control pressure p_DRE is specified, there is only one single possible first control current i_DRE to be set for said first control pressure.

The present characteristic curve is approximately linear. In the context of the preferred digital control, the present approximation quality is readily sufficient, since the remaining non-linearity is compensated by the inverse model, without fear of technical disadvantages.

Finally, reference is made to a parallel patent application of the present patent applicant which has the same priority date and which relates to further details of the axial piston machine according to the disclosure.

REFERENCE SIGNS

10 Axial piston machine
11 First working port
12 Second working port
13 Feed pump
14 Feed pressure limiting valve
15 Control supply
16 Control return
17 Tank
18 Main pump
19 Drive shaft
20 Control cylinder
21 First control chamber
22 Second control chamber
23 Feed valve
30 Pressure control valve
31 Actuation solenoid of the pressure control valve
32 3/2-way switching valve
33 Actuation solenoid of the 3/2-way switching valve
40 Hydraulic motor
41 Fan wheel
50 Trajectory planning filter
51 Inverse model of axial piston machine
52 Controller
53 Target/actual value comparison
54 Superposition of feed-forward control and closed-loop control
55 Determination of the actual conveying pressure difference
60 Zero case
61 Positive case
62 Negative case
63 Case differentiation
64 Inverse model of the pressure control valve
65 Inverse model of the 3/2-way switching valve
70 Speed sensor
71 First pressure sensor
72 Second pressure sensor
dpX_target Target control pressure difference
dp_target Target conveying pressure difference
i_DRE First control current
i_3/2_ Second control current
p_A First actual pressure
p_B Second actual pressure
n Actual speed
p_DRE First control pressure
p_3/2 Second control pressure

What is claimed is:

1. A method for operating an axial piston machine having a displacement volume that is continuously adjustable using a double-acting control cylinder comprising two oppositely acting control chambers, the method comprising:
    a) providing a corresponding axial piston machine, wherein an electrically adjustable pressure control valve is connected to one control chamber, wherein another control chamber is connected to an electrically adjustable 3/2-way switching valve;
    b) providing a target control pressure difference, wherein a zero case is defined as a case in which the target control pressure difference is essentially zero, wherein a positive case is defined as a case in which the target control pressure difference is positive, wherein the target control pressure difference does not fall under the zero case, wherein a negative case is defined as a case in which the target control pressure difference is negative, wherein the target control pressure difference does not fall under the zero case;
    c) calculating a first control pressure and a second control pressure, wherein in a context of a case differentiation, determining whether the zero case, the positive case, or the negative case is present, wherein a result of the case differentiation is used in the calculation of the first control pressure and the second control pressure; and
    d) energizing the pressure control valve according to the first control pressure and energizing the 3/2-way switching valve according to the second control pressure.

2. The method according to claim 1, wherein parts b), c) and d) are performed continually and in parallel or quasi-parallel with each other during operation of the axial piston machine.

3. The method according to claim 1, wherein:
the pressure control valve is energized with a first control current,
the 3/2-way switching valve is energized with a second control current,
the first control current is calculated from the first control pressure using an inverse model of the pressure control valve, and
the second control current is calculated from the second control pressure using an inverse model of the 3/2-way switching valve.

4. The method according to claim 1, wherein:
the first control pressure and the second control pressure are calculated for the zero case, the positive case, and the negative case separately, and
at least one result of the calculations is selected based on the case differentiation.

5. The method according to claim 1, wherein:
in the zero case, a first pair and a second pair are calculated, the first pair and the second pair each comprise the first control pressure and the second control pressure,
in the first pair, the second control pressure equals a pressure in a control supply,
the first control pressure is calculated according to the second control pressure and the target control pressure difference,
in the second pair, the second control pressure is equal to a pressure in a control return,
the first control pressure is calculated according to the second control pressure and the target control pressure difference, and
according to a case most recently present in a context of the case differentiation and/or, if desired, a case expected to be present in the future, deciding whether the first pair or the second pair is used as a calculation result.

6. The method according to claim 5, wherein:
in a context of the zero case, the first pair and the second pair are calculated, and
one calculation result of the two calculation results is selected based on the decision regarding the first pair or the second pair.

7. The method according to claim 1, wherein:
in the positive case, the second control pressure is equal to a pressure in a control return, and
the first control pressure is calculated according to the second control pressure and the target control pressure difference.

8. The method according to claim 1, wherein:
in the negative case, the second control pressure is equal to a pressure in a control supply,
the first control pressure is calculated according to the second control pressure and the target control pressure difference.

9. The method according to claim 1, wherein:
the axial piston machine includes a first working port and a second working port,
a first pressure sensor and a second pressure sensor are provided,
a first actual pressure is measured by the first pressure sensor at the first working port and a second actual pressure is measured by the second pressure sensor at the second working port, and
the target control pressure difference is calculated according to the first actual pressure and second actual pressure, and a specified target conveying pressure difference.

10. The method according to claim 9, wherein:
the axial piston machine includes a speed sensor,
an actual speed of the axial piston machine is measured using the speed sensor, and
the target control pressure difference is calculated, in a sense of feed-forward control, according to the actual speed.

* * * * *